United States Patent
Minobe et al.

(10) Patent No.: US 6,768,089 B2
(45) Date of Patent: Jul. 27, 2004

(54) MICROWAVE CONTINUOUS HEATING APPARATUS

(75) Inventors: Tomio Minobe, Fujimi (JP); Kouji Mikami, Saitama (JP); Hiromi Katou, Kuwana (JP); Shoichi Goto, Nagoya (JP); Satoshi Ishikawa, Anjo (JP)

(73) Assignees: Micro Denshi Co., Ltd. (JP); Denso Corporation (JP)

( * ) Notice: Subject to any disclaimer, the term of this patent is extended or adjusted under 35 U.S.C. 154(b) by 0 days.

(21) Appl. No.: 10/252,004

(22) Filed: Sep. 23, 2002

(65) Prior Publication Data

US 2003/0057205 A1 Mar. 27, 2003

(30) Foreign Application Priority Data

Sep. 26, 2001 (JP) ......................................... 2001-294694

(51) Int. Cl.[7] .............................. H05B 6/76; H05B 6/78
(52) U.S. Cl. ....................... 219/699; 219/700; 219/739; 34/259
(58) Field of Search .................................. 219/699, 700, 219/701, 738, 739, 740, 741, 744; 174/35 R, 35 MS; 34/259, 264

(56) References Cited

U.S. PATENT DOCUMENTS

| | | | | |
|---|---|---|---|---|
| 3,151,230 A | * | 9/1964 | Britton | 219/699 |
| 3,858,022 A | * | 12/1974 | Smith | 219/699 |
| 3,881,403 A | * | 5/1975 | Ingram et al. | 219/699 |
| 3,974,353 A | * | 8/1976 | Goltsos | 219/700 |
| 4,182,946 A | * | 1/1980 | Wayne et al. | 219/699 |
| 6,455,826 B1 | * | 9/2002 | Araya et al. | 219/699 |

FOREIGN PATENT DOCUMENTS

| JP | A-2001-130970 | 5/2001 |
|---|---|---|
| JP | A-2001-130973 | 5/2001 |

* cited by examiner

Primary Examiner—Philip H. Leung
(74) Attorney, Agent, or Firm—Nixon & Vanderhye PC

(57) ABSTRACT

A microwave continuous heating apparatus is provided with a heating compartment having openings at its front and rear portions and a transfer device which carries a to-be-heated object held thereon through the heating compartment, and microwave electric power is irradiated onto the to-be-heated object that passes through the heating compartment to heat the same. Two microwave absorbing compartments, through which the to-be-heated object passes, are connected to the front and the rear portions of the heating compartment, respectively. A plurality of reflecting plates of metal which are spaced from each other in a forward-and-backward direction are transferred by the transfer device. The object to be heated is placed between two adjacent reflecting plates. The reflecting plates are placed on the transfer device so that at least one reflecting plate is positioned in each microwave absorbing compartment, at least during irradiation of microwaves into the heating compartment.

17 Claims, 11 Drawing Sheets

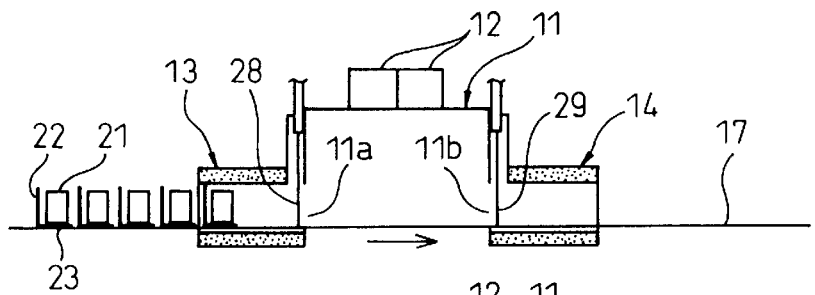
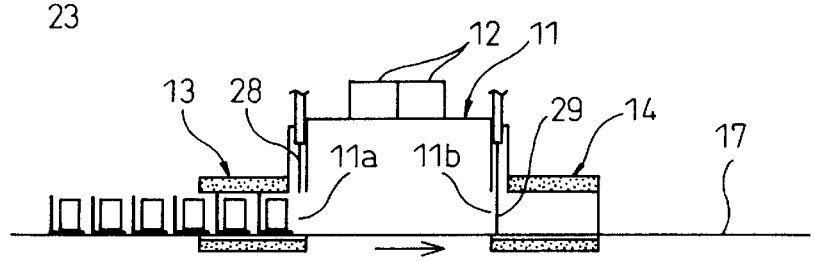
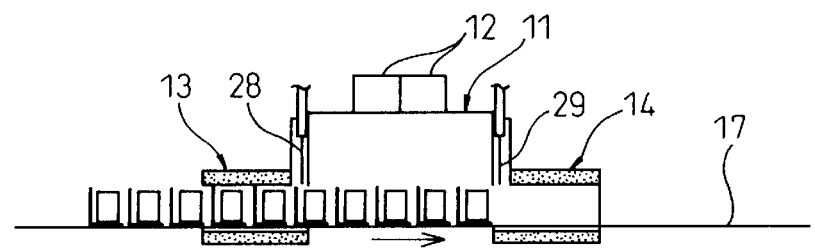
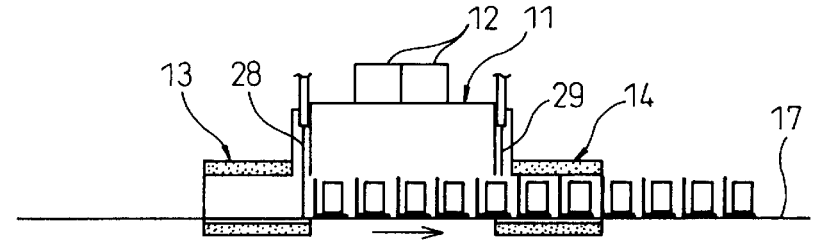
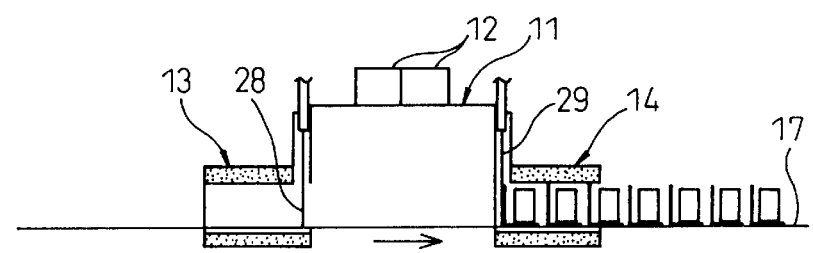

MICROWAVE CONTINUOUS HEATING APPARATUS

BACKGROUND OF THE INVENTION

1. Field of the Invention

The present invention relates to a microwave continuous heating apparatus in which a to-be-heated object continuously passes through a heating compartment, and microwave electric power is irradiated onto the to-be-heated object to heat the same in the heating compartment. More particularly, the present invention relates to a microwave continuous heating apparatus in which it is not necessary to irradiate microwave electric power intermittently when the to-be-heated object is transferred into or removed from the heating compartment, and microwave electric power is prevented from leaking and, additionally, the quality of the to-be-heated object is improved by uniformly irradiating microwave electric power onto the to-be-heated object.

2. Description of the Related Art

Conventionally, in a general microwave continuous heating apparatus, the to-be-heated object is transferred into the heating compartment through an entrance side opening provided in the heating compartment, and microwave electric power is irradiated onto the to-be-heated object in the heating compartment. After that, the to-be-heated object is removed from the heating compartment through an exit side opening provided in the heating compartment.

However, if such an apparatus is used, there is a problem in which microwaves leak toward outside of the heating compartment through the opening.

SUMMARY OF THE INVENTION

In view of the above situation, the object of the present invention is to provide a microwave continuous heating apparatus in which leakage of microwaves is reliably prevented so that a heating process is efficiently carried out by continuously irradiating microwave electric power.

To archive the above object, according to a first embodiment of the present invention, there is provided a microwave continuous heating apparatus provided with a heating compartment having openings at its front and rear portions; and a transfer device which carries a to-be-heated object held thereon through the heating compartment, whereby the object to be heated is irradiated with microwave electric power while passing through the heating compartment to heat the same, comprising microwave absorbing compartments connected to the front and the rear portions of the heating compartment so that the object to be heated can pass therethrough; and a plurality of reflecting plates of metal which are spaced from each other in a forward and backward direction and which are transferred by the transfer device, wherein the object to be heated is placed between two adjacent reflecting plates, and the reflecting plates are placed on the transfer device so that at least one reflecting plate is positioned in each microwave absorbing compartment, at least during irradiation of microwave electric power in the heating compartment.

In a microwave continuous heating apparatus having the above structure, a plurality of to-be-heated objects that should be processed are placed between two adjacent reflecting plates, respectively, and are successively transferred into the heating compartment and, then can be heated by microwave electric power while passing through the heating compartment.

The reflecting plate is placed on the transfer device so that at least one reflecting plate is positioned in a path of each of front and rear microwave absorbing compartment, at least during irradiation of microwave electric power in the heating compartment. Therefore, even if the size of the to-be-heated object is larger than the wavelength of the microwave electric power used in the heating compartment, microwave electric power is effectively reflected, absorbed and dispersed by the microwave absorbing compartment and the reflecting plate positioned in the absorbing compartment.

Therefore, it is not necessary to intermittently irradiate microwave electric power, and thus, the to-be-heated object can be efficiently heated by continuous irradiation of microwave electric power.

Even in conveyance of to-be-heated objects at the minimum pitches corresponding to the distance between the objects, microwave electric power can be prevented from leaking in the microwave absorbing compartment, and the to-be-heated objects can be certainly transferred. Also, as the microwave electric power can be continuously irradiated, the length of the heating compartment and the length of the microwave absorbing compartments provided at the front and rear portions of the heating compartment can be minimized, to thereby make the apparatus small, as a whole.

Especially, since an unnecessary space between the objects to be heated can be minimized, the number of objects to be heated that can be accommodated in the heating compartment can be increased. Thus, a heating efficiency by microwave electric power can be enhanced, and the cost for the heating process can be reduced.

According to a second embodiment of the present invention, in addition to the first embodiment, there is provided a microwave continuous heating apparatus, wherein the to-be-heated object and the reflecting plates are supplied onto the transfer device in the vicinity of an entrance of the microwave absorbing compartment provided at the front of the heating compartment, and are removed from the transfer device in the vicinity of an exit of the microwave absorbing compartment provided at the rear of the heating compartment.

In a microwave continuous heating apparatus according to the second embodiment, as a distance in which the to-be-heated object and the reflecting plate are transferred by the transfer device can be minimized, a load applied to the transfer device can be further reduced.

According to a third embodiment of the present invention, in addition to the second embodiment, there is provided a microwave continuous heating apparatus, wherein the reflecting plates are made integral with a jig on which the to-be-heated object can be placed at a front end or a rear end, or both the front and rear ends of the jig.

In a microwave continuous heating apparatus according to the third embodiment, as the reflecting plate is integral with the jig, when the to-be-heated object is placed on the jig, a space between the to-be-heated object and the jig can be easily maintained at a predetermined space, and the to-be-heated object along with the reflecting plate can be supplied onto or removed from the transfer device via the jig. Thus, the operation efficiency can be improved.

According to a fourth embodiment of the present invention, in addition to the third embodiment, there is provided a microwave continuous heating apparatus, wherein a plurality of vacant jigs having no object to be heated thereon are placed and transferred at the front and rear portions of the jig having the object to be heated thereon, respectively.

In a microwave continuous heating apparatus according to the fourth embodiment, the to-be-heated object placed on the jig integral with the reflecting plate is transferred, and at least one reflecting plate can be easily placed on a path of each of the front and rear microwave absorbing compartments, at least during irradiation of microwave electric power in the heating compartment, by effectively using the jig.

According to a fifth embodiment of the present invention, there is provided a microwave continuous heating apparatus provided with a heating compartment having openings at its front and rear portions; and a transfer device which carries a to-be-heated object held thereon through the heating compartment, whereby the object to be heated is irradiated with microwave electric power during passing through the heating compartment to heat the same, comprising microwave absorbing compartments connected to the front and the rear portions of the heating compartment so that the object to be heated can pass therethrough; shutters provided at the front and rear openings of the heating compartment; and a plurality of reflecting plates which are arranged in a line with the objects to be heated, in a transfer section between the vicinity of an entrance of the microwave absorbing compartment provided at the front of the heating compartment and the vicinity of an exit of the microwave absorbing compartment provided at the rear of the heating compartment, wherein the front and rear shutters are opened when the frontmost to-be-heated object or the reflecting plate of the line reaches the vicinity of the shutter, and are closed when the rearmost to-be-heated object or the reflecting plate of the line passes through the shutter.

In a microwave continuous heating apparatus according to the fifth embodiment, a plurality of reflecting plates, which are arranged in a line with the to-be-heated object, is transferred through a transfer section between the vicinity of an entrance of the microwave absorbing compartment provided at the front of the heating compartment and the vicinity of an exit of the microwave absorbing compartment provided at the rear of the heating compartment, and shutters provided at front and rear openings of the heating compartment is opened when the frontmost to-be-heated object or the reflecting plate of the line reaches the vicinity of the shutter, and are closed when the rearmost to-be-heated object or the reflecting plate of the line passes through the shutter. Therefore, when the shutters are closed, the shutters can prevent leakage of microwave electric power from the heating compartment.

On the other hand, when the shutter is opened, the reflecting plate is positioned in the path of the microwave absorbing compartment, so that microwave electric power can be effectively reflected, absorbed and dispersed by the microwave absorbing compartment and the reflecting plate positioned therein, even if the size of the to-be-heated object that passes through the front and rear openings of the heating compartment is larger than the wavelength of the microwave electric power used in the heating compartment.

Therefore, it is not necessary to intermittently irradiate microwave electric power and, thus, the to-be-heated object can be efficiently heated by continuous irradiation of microwave electric power.

Even in conveyance of to-be-heated objects at the minimum pitches corresponding to the distance between the objects, microwave electric power can be prevented from leaking, and the to-be-heated objects can be certainly transferred. Also, as the microwave electric power can be continuously irradiated, the length of the heating compartment and the length of the microwave absorbing compartments provided at the front and rear portions of the heating compartment can be minimized, to thereby make the apparatus small as a whole.

Since an unnecessary space between the objects to be heated can be minimized, the number of objects to be heated that can be accommodated in the heating compartment can be increased. Thus, a heating efficiency by microwave electric power can be enhanced, and the cost for the heating process can be reduced.

It is not necessary to transfer a number of vacant reflecting plates when a plurality of to-be-heated objects are transferred. Therefore, the number of reflecting plates that are necessary when the to-be-heated objects are heated can be minimized.

Therefore, a load applied to the transfer device can be reduced, and the efficiency of heating can be improved.

The to-be-heated object and the reflecting plate can be supplied onto the transfer device in the vicinity of the entrance of the microwave absorbing compartment provided at the front of the heating compartment, and can be removed from the transfer device in the vicinity of the exit of the microwave absorbing compartment provided at the rear of the heating compartment. Therefore, a distance in which the to-be-heated object and the reflecting plate are transferred by the transfer device can be minimized, and a load applied to the transfer device can be further reduced.

According to a sixth embodiment of the present invention, in addition to the fifth embodiment, there is provided a microwave continuous heating apparatus, wherein the reflecting plates are made integral with a jig on which the object to be heated can be placed, at a front end or a rear end, or both the front and rear ends of the jig.

In a microwave continuously heating apparatus according to the sixth embodiment, since the reflecting plate is integral with the jig, when the to-be-heated object is placed on the jig, a space between the to-be-heated object and the jig can be easily maintained at a predetermined space, and the to-be-heated object along with the reflecting plate can be supplied onto or removed from the transfer device via the jig. Thus, the operation efficiency can be improved.

According to a seventh embodiment of the present invention, in addition to the first or the fifth embodiment, there is provided a microwave continuous heating apparatus, wherein the transfer device has a circulating carriage, and the reflecting plates are spaced and placed on the entire periphery of the circulating carriage.

In a microwave continuously heating apparatus according to the seventh embodiment, as the reflecting plates that are spaced from each other are circulated along with the circulating carriage, an operation for supplying the reflecting plate onto or removing the same from the transfer device can be omitted, and the to-be-heated object can be easily transferred by only placing the to-be-heated object between two adjacent reflecting plates.

At least one reflecting plate can be easily positioned in each of both microwave absorbing compartments, at least during irradiation of microwave electric power in the heating compartment.

According to an eighth embodiment of the present invention, in addition to the first or the fifth embodiment, there is provided a microwave continuous heating apparatus, wherein the shape and size of the reflecting plates are such that they can pass through the microwave absorbing compartment with a slight gap, and the inner surface of the microwave absorbing compartment is covered by a microwave absorbing body.

In a microwave continuous heating apparatus according to the eighth embodiment, even if the size of the to-be-heated object is larger than one wavelength of the used microwave, almost all of the microwave electric power that leaks from the heating compartment to the microwave absorbing compartment can be reflected during movement of the reflecting plate within the microwave absorbing compartment.

Microwave electric power that passes through a small space between the reflecting plate and the microwave absorbing body can be effectively absorbed, attenuated and dispersed by the microwave absorbing body.

Therefore, the length of the microwave absorbing compartment can be minimized, so that the size of the apparatus can be entirely reduced.

According to a ninth embodiment of the present invention, in addition to the first and the fifth embodiment, there is provide a microwave continuous heating apparatus, wherein the reflecting plates bent in the form of "L" in cross section or is curved, in cross section, toward the object to be heated.

In a microwave continuous heating apparatus according to the ninth embodiment, as the reflecting plate is L-shaped or is curved in cross section, microwave electric power is prevented from leaking by the reflecting plate, and the reflected microwave electric power is acted on the to-be-heated object. This contributes to a uniform heating of the to-be-heated object.

According to a tenth embodiment of the present invention, in addition to the first and the fifth embodiment, there is provided a microwave continuous heating apparatus, wherein the reflecting plates are each comprised of a first planar reflecting plate and a second reflecting plate that is L-shaped or is curved in cross section toward the object to be heated.

In a microwave continuous heating apparatus according to the tenth embodiment, microwave electric power is prevented from leaking by the first planar reflecting plate, and microwave electric power is reflected toward the to-be-heated object by the second curved reflecting plate. This contributes to the uniform heating of the to-be-heated object.

According to a eleventh embodiment of the present invention, in addition to the first or the fifth embodiment, there is provided a microwave continuous heating apparatus, wherein ceramic bodies as the objects to be heated, are continuously heated.

The eleventh embodiment provides a microwave continuous heating apparatus used as a drying apparatus to dry a ceramic, for example, a ceramic honeycomb body.

The present invention may be more fully understood from the description of preferred embodiments of the invention set forth below, together with the accompanying drawings.

BRIEF DESCRIPTION OF THE DRAWINGS

In the drawings:

FIGS. 6A, 6B, 6C, 6D and 6E are explanatory views of a method of using a continuous heating apparatus shown in FIG. 5, respectively;

DESCRIPTION OF PREFERRED EMBODIMENTS

Embodiments of the present invention will be described with reference to drawings.

FIG. 1 to FIG. 4 show a first embodiment of the present invention.

Figure 1:
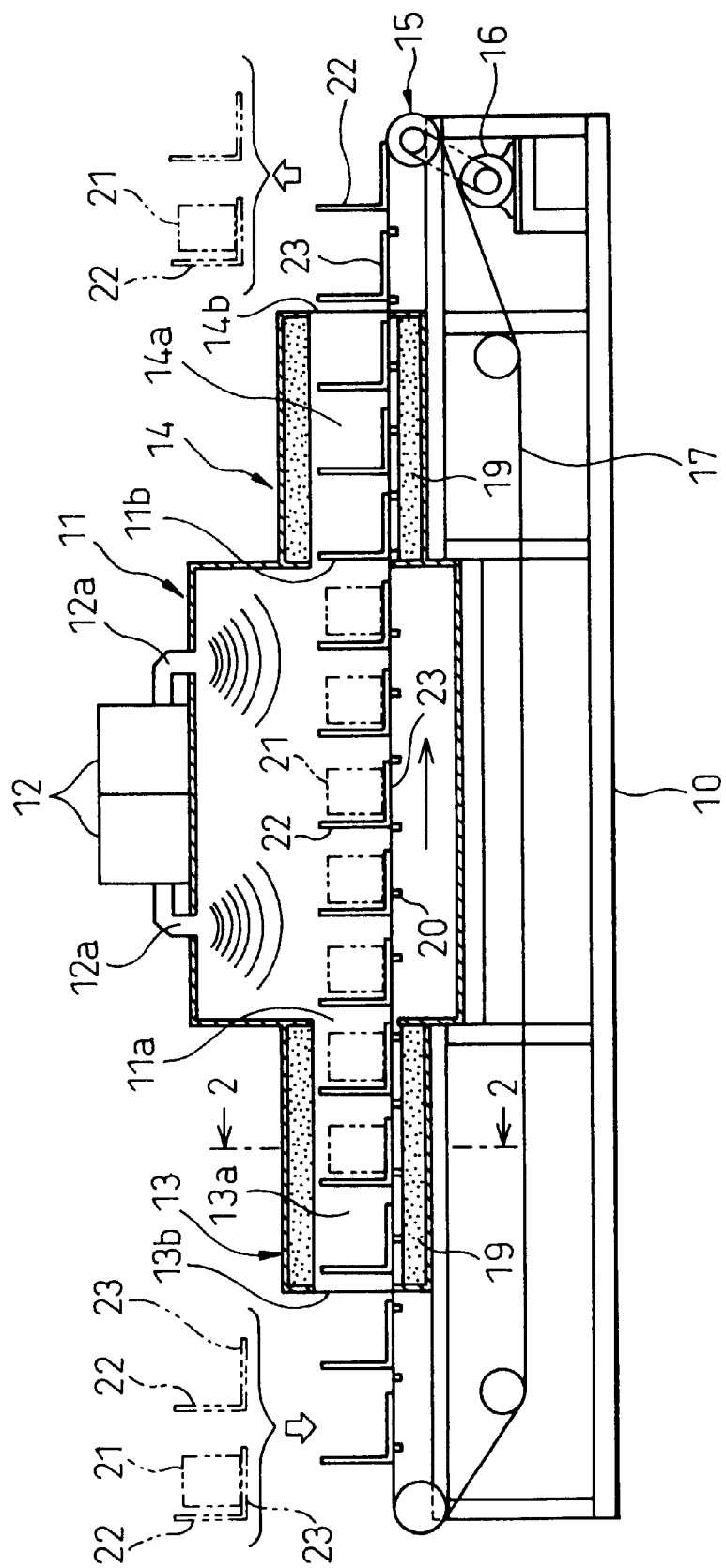
FIG. 1 is a schematic longitudinal sectional front view of an embodiment of a microwave continuous heating apparatus according to the present invention.
Figure 2:
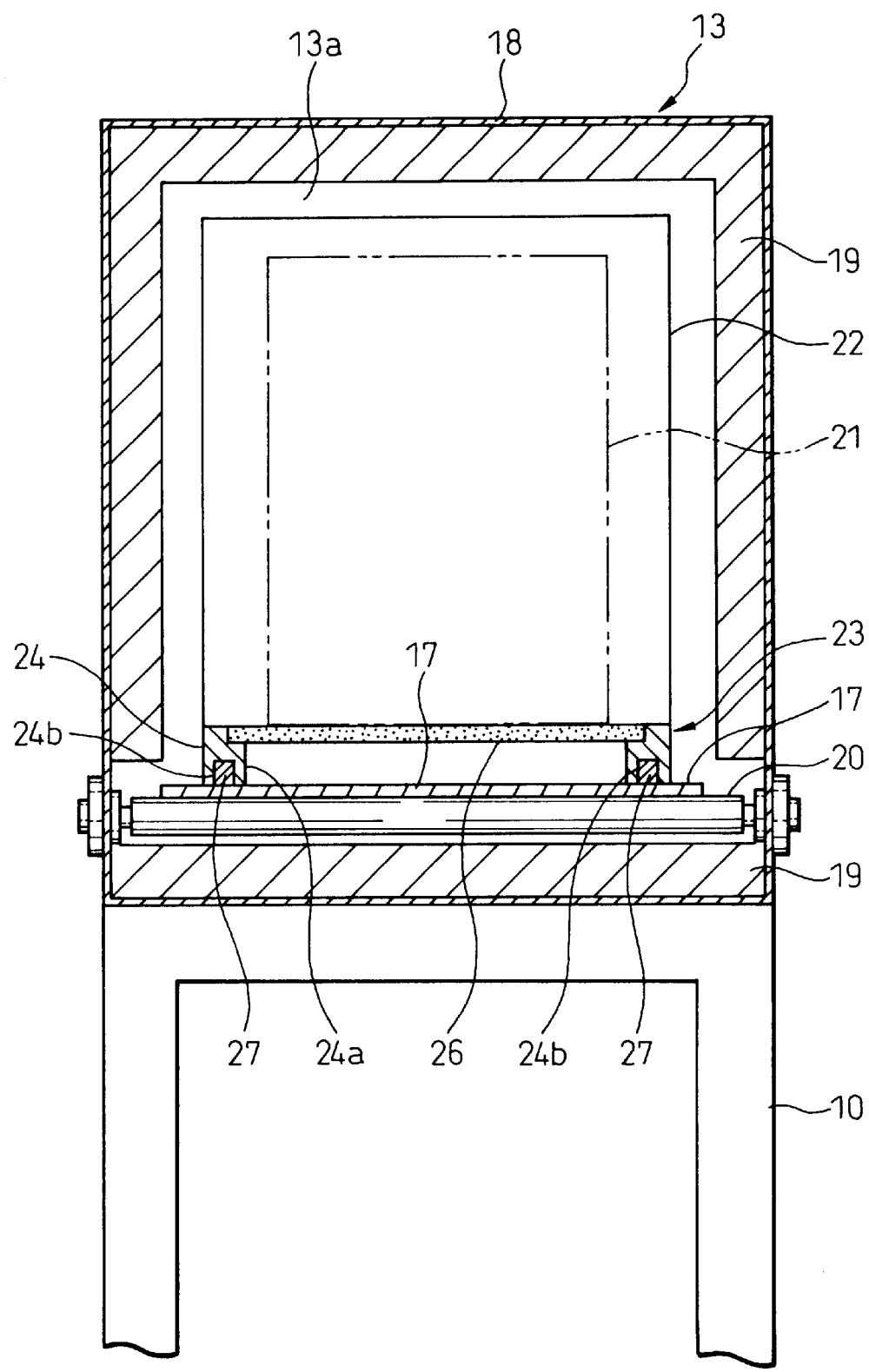
FIG. 2 is a sectional view of a continuous heating apparatus taken along the line 2—2 in FIG. 1.
Figure 3:
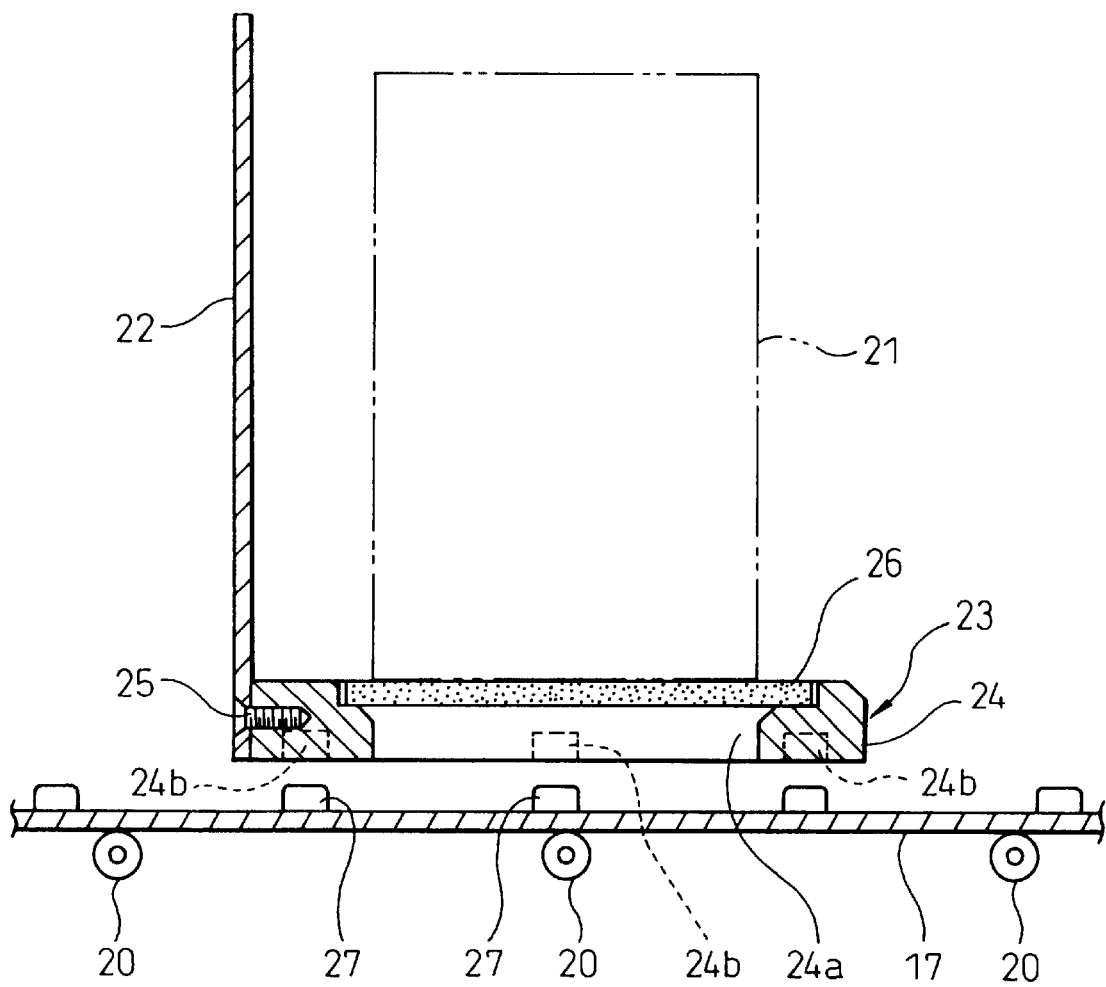
FIG. 3 is a longitudinal sectional view of a conveyor of a continuous heating apparatus shown in FIG. 1, and a jig and a reflecting plate supplied onto the conveyor.
Figure 4A:
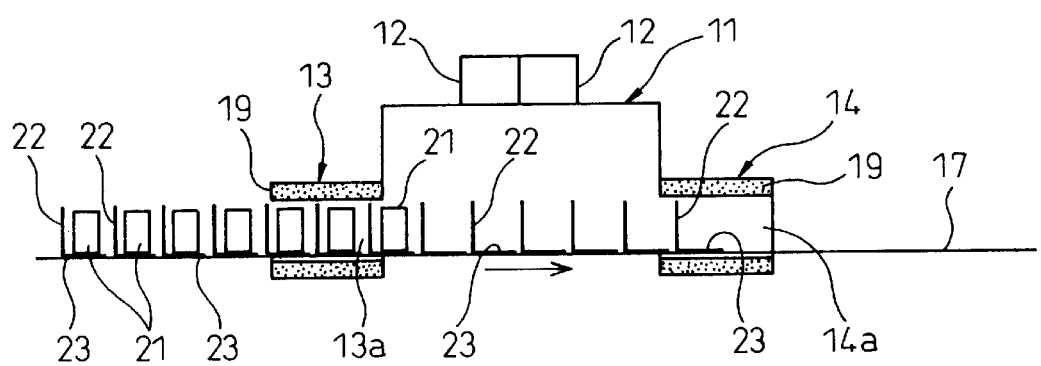
FIGS. 4A and 4B are explanatory views of a method of using an apparatus shown in FIG. 1, respectively.
Figure 4B:
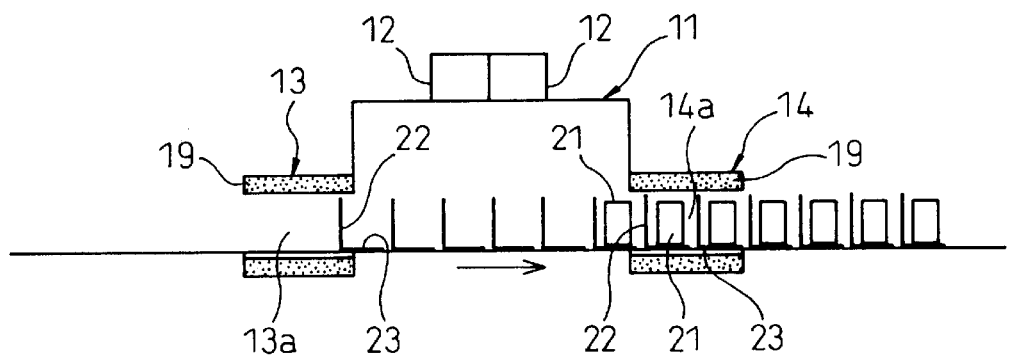

FIG. 1 is a schematic longitudinal sectional front view of a microwave continuous heating apparatus; FIG. 2 is a sectional view of the microwave continuous heating apparatus shown in FIG. 1, taken along the line 2—2 in FIG. 1; FIG. 3 is a longitudinal sectional view of a conveyor of the continuous heating apparatus shown in FIG. 1, and a jig and a reflecting plate supplied onto the conveyor; and FIGS. 4A and 4B are explanatory views of a method of using the continuous heating apparatus shown in FIG. 1.

As shown in FIG. 1, the microwave continuous heating apparatus has a heating compartment 11 in which openings 11a, 11b are formed, respectively, at its entrance side and exit side. A plurality of microwave generators 12 are provided on the upper portion of the heating compartment 11. A microwave generator 12 transmits microwave electric power into the heating compartment 11 via a waveguide 12a.

Microwave absorbing compartments 13, 14 having paths 13a, 14a therein are connected to the front and the rear portions of the heating compartment 11, respectively. The microwave absorbing compartments 13, 14 and the heating compartment 11 are mounted on a base 10 so that the paths 13a, 14a are arranged in a line via the heating compartment 11.

A transfer device entirely designated by numeral 15 has a conveyor belt 17 as a circulating carriage that is driven and rotated in a clockwise direction by a driving motor 16. The conveyor belt 17 is linearly provided at a section between the vicinity of an entrance 13b of the microwave absorbing compartment 13 positioned at the front of the heating compartment 11 and the vicinity of an exit 14b of the microwave absorbing compartment 14 positioned at the rear of the heating compartment 11.

It is preferable that the conveyor belt 17 be made of a material that hardly absorbs microwave electric power, such as Teflon coated glass wool or polyamide.

As shown in FIG. 2, the outer periphery of the microwave absorbing compartment 13 provided at the front, i.e., entrance side, of the heating compartment 11 is covered by a metal cover 18. The inner surface of the microwave absorbing compartment 13 is covered by a microwave absorbing body 19 made of a material that absorbs microwave electric power well, for example, carbon, ferrite, silicon carbide, or the like.

Receiving rollers 20 to support the under surface of the conveyor belt 17, that are spaced in a forward-and-backward direction, are provided on the inner bottom portion of the microwave absorbing compartment 13.

According to the above construction, almost all of the inner periphery of the path 13a of the microwave absorbing compartment 13 is covered by the microwave absorbing body 19.

The path 13a of the microwave absorbing compartment 13 is substantially shaped like a square in cross section.

Although illustrated figures and detailed descriptions are omitted, the path 14a of the microwave absorbing compartment 14 has a stricture similar to that of the path 13a of the microwave absorbing compartment 13, and almost all of the inner periphery of the path 14a of the microwave absorbing compartment 14 is covered by the microwave absorbing body 19.

As shown in FIG. 1, a to-be-heated object designated by numeral 21 and a metal reflecting plate 22 are supplied onto the conveyor belt 17, at the front of the heating compartment 11, i.e., in the vicinity of the entrance 13b of the microwave absorbing compartment 13, via a jig 23 that is described later.

The to-be-heated object 21 and the reflecting plate 22 are removed from the conveyor belt 17 with the jig 23, at the rear of the heating compartment 11, i.e., in the vicinity of the exit 14b of the microwave absorbing compartment 14.

The shape and the size of the reflecting plates 22 are such that the reflecting plate 22 substantially spreads over the entire cross section of the paths 13a, 14a of the microwave absorbing compartments 13, 14, when the plate passes through the paths with a slight gap.

As shown in FIG. 2 and FIG. 3, the jig 23 has a metal seating base 24 on which the to-be-heated object 21 is placed. In this embodiment, the lower end of the reflecting plate 22 is integrally connected to the rear end of the seating base 24 in the conveying direction by a screw 25.

A large opening 24a which permits the microwave electric power to effectively pass therethrough is formed in the seating base 24. A transmission plate 25 made of a material through which microwave electric power can easily pass, for example, silicone resin, mica-included resin, polyethylene, polypropylene resin, or the like, is attached to the opening 24a.

If the permeable plate 26 is made of a material having high hygroscopicity or moisture permeability, for example, a porous material, it promotes drying of the under surface of the to-be-heated object 21.

Therefore, if the jig 23 is used, the to-be-heated object 21 can be satisfactorily heated in the heating compartment 11 without influence of the metal seating base 24.

The reflecting plate 22 may be provided at the front end of the jig 23 in the conveying direction. The reflecting plates 22 may be provided at the front end and the rear end of the jig 23, respectively.

The reflecting plate 22 may be made integral with the seating base 24 of the jig 23.

As shown in FIG. 2 and FIG. 3, in this embodiment, there is a possibility that a deviation of the jig 23 occurs on the conveyor belt 17.

Therefore, it is preferable that a mechanism for preventing the positional deviation of the jig 23 that would otherwise be displaced in the width direction of the conveyor belt 17 be provided, and that, for example, a plurality of positioning projections 27 that are arranged in two front and rear rows spaced at a predetermined distance be provided on the entire periphery of the conveyor belt 17, while recesses 24b engaged by the projections 27 are provided on the lower surface of the base 24 of the jig 23.

In the continuous heating apparatus having the above structure, a plurality of reflecting plates 22 integral with the jigs 23 are spaced from each other, and are successively transferred by the conveyor belt 17.

The to-be-heated object 21 placed on the jig 23 is supplied onto the conveyor belt 17 to be located between two adjacent reflecting plates 22, 22, and is successively transferred by the conveyor belt 17.

The reflecting plates 22 are supplied onto the conveyor belt 17 in such a way that at least one, preferably a plurality of, reflecting plates 22 are positioned in each of the paths 13a, 14a of the microwave absorbing compartments 13, 14, at least during irradiation of microwave electric power by use of the microwave generator 12 in the heating compartment 11.

According to the above structure, microwave electric power that leaks from the heating compartment 11 can be reflected, absorbed and dispersed by the microwave absorbing compartment and the reflecting plate therein.

This embodiment will be described in more detail with reference to FIG. 4. When the microwave heating operation is begun, a plurality of vacant jigs 23 having thereon no objects 21 to be heated, along with the reflecting plates 22, are supplied onto the conveyor belt 17, and are successively transferred, before the jigs 23 having the to-be-heated object 21 thereon are supplied onto the conveyor belt 17.

After a required number of vacant jigs 23 are supplied, the jigs 23 having the to-be-heated objects 21 thereon are supplied onto the conveyor belt 17, and are successively transferred.

As shown in FIG. 4A, after at least the frontmost vacant jig 23 (preferably, a plurality of vacant jigs including the frontmost one), along with the reflecting plates 22, enter the path 14a of the microwave absorbing compartment 14, in the rear, i.e., on the outlet side, of the heating compartment 11, the microwave generator 12 is activated.

At this time, the jig 23 positioned in the heating compartment 11 has no to-be-heated object thereon. The number of to-be-supplied vacant jigs 23 is predetermined so that the microwave generator 12 is activated immediately after the jig 23 having the to-be-heated object 21 thereon enters the heating compartment 11.

Accordingly, it is not necessary to provide a shutter or the like at the exit side opening 11b of the heating compartment 11. Therefore, leakage of microwave electric power can be reliably prevented at the beginning of the microwave heating operation.

After the jig 23 having thereon the to-be-heated object 21 that has been heated last is placed on the conveyor belt 17, a predetermined number of vacant jigs 23 are supplied onto the conveyor belt 17, and are successively transferred.

In this case, as shown in FIG. 4B, the number of to-be-supplied vacant jigs 23 is predetermined so that at least last vacant jig 23 (preferably, a plurality of jigs) remains in the front portion of the heating compartment 11, i.e., the path 13a of the microwave absorbing compartment 13 when the vacant jig 23 having thereon the last to-be-heated object, along with the reflecting plate 22, enters the rear portion of the heating compartment 11, i.e., the path 14a of the microwave absorbing compartment 14.

The operation of the microwave generator 12 is stopped to stop irradiation of microwave electric power in the heating compartment 11 immediately before the jig 23 having thereon the last to-be-heated object 21 along with the reflecting plate 22 exits the heating compartment 11, i.e., when at least the last vacant jig 23 (preferably, a plurality of jigs) remains in the front portion of the heating compartment 11, i.e., the path 13a of the microwave absorbing compartment 13.

Accordingly, it is not necessary to provide shutters or the like at openings 11a, 11b of the heating compartment 11. Therefore, leakage of microwave electric power can be reliably prevented at the end of the microwave heating operation.

The to-be-heated object 21 placed on the jig 23 receives microwave energy and is heated while passing through the heating compartment 11.

If the distance between the to-be-heated object 21 and the reflecting plate 22 is approximately identical to ¼ wavelength (about 30 mm if the frequency of microwave electric power used is 2450 MHz), the heating operation can be satisfactorily carried out without having an influence of the metal reflecting plate 22.

On the other hand, since openings 11a, 11b of the heating compartment 11 are normally opened, microwave electric power leaks from the openings 11a, 11b of the heating compartment 11 to the paths 13a, 14a of the microwave absorbing compartments 13, 14. However, the reflecting plates 22 positioned in the microwave absorbing compartment 13, 14 reflect and shield microwave electric power. Therefore, microwaves that leak through a space between the periphery of the reflecting plate 22 and the microwave absorbing body 19 is absorbed and attenuated by the absorbing body 19.

Thus, reflections and attenuations of microwave electric power corresponding to the number of the reflecting plates 22 in the microwave absorbing compartments 13, 14, are repeated to prevent leakage of the microwave electric power.

According to the above structure for preventing leakage of microwaves by use of the microwave absorbing compartments 13, 14 and the reflecting plate 22, even if the size of the to-be-heated object 21 passing through the front and rear openings 11a, 11b of the heating compartment 11 is larger than the wavelength of microwave electric power used in the heating compartment 11, leakage of microwave electric power can be reliably prevented.

Therefore, it is not necessary to intermittently irradiate microwave electric power, and thus, the to-be-heated object can be efficiently heated by continuous irradiation of microwave electric power.

Even in the conveyance of to-be-heated objects 21 at the minimum pitches corresponding to the distance between the objects, microwave electric power can be prevented from leaking in the paths 13a, 14a of the microwave absorbing compartments 13, 14, and the to-be-heated objects can be certainly transferred. Also, as the microwave electric power can be continuously irradiated, the length of the heating compartment and the length of the microwave absorbing compartments provided at the front and the rear portions of the heating compartment can be minimized, to thereby make the apparatus small, as a whole.

Especially, as an unnecessary space between the objects 21 to be heated can be minimized, the number of objects 21 to be heated that can be accommodated in the heating compartment 11 can be increased. Thus, a heating efficiency by microwave electric power can be enhanced, and the cost for the heating process can be reduced.

In this embodiment, the to-be-heated object 21 and the reflecting plate 22 can be supplied onto the conveyor belt 17 in the vicinity of the entrance 13b of the microwave absorbing compartment 13 provided at the front portion of the heating compartment 11, and can be removed from the conveyor belt 17 in the vicinity of the exit 14b of the microwave absorbing compartment 14 provided at the rear portion of the heating compartment 11. Therefore, a distance in which the to-be-heated object and the reflecting plate are transferred by the transfer device can be minimized, and a load applied to the conveyor belt 17 can be reduced.

In this embodiment, as the reflecting plate 22 is integral with the jig 23, when the to-be-heated object 21 is placed on the jig 23, a space between the to-be-heated object 21 and the jig 23 can be easily maintained at a predetermined space.

The to-be-heated object 21 along with the reflecting plate 22 can be supplied onto or removed from the conveyor belt 17 with the jig 23. Thus, the operation efficiency can be improved.

In this embodiment, a plurality of vacant jigs 23 are located before and after the jig 23 having thereon the to-be-heated objects 21, respectively, and are transferred together therewith. Therefore, at least one reflecting plate 22 can be easily positioned in each of the paths 13a, 14a of the microwave absorbing compartments 13, 14, at least during irradiation of microwave electric power in the heating compartment 11, by effectively utilizing the jigs 23.

Figure 5:
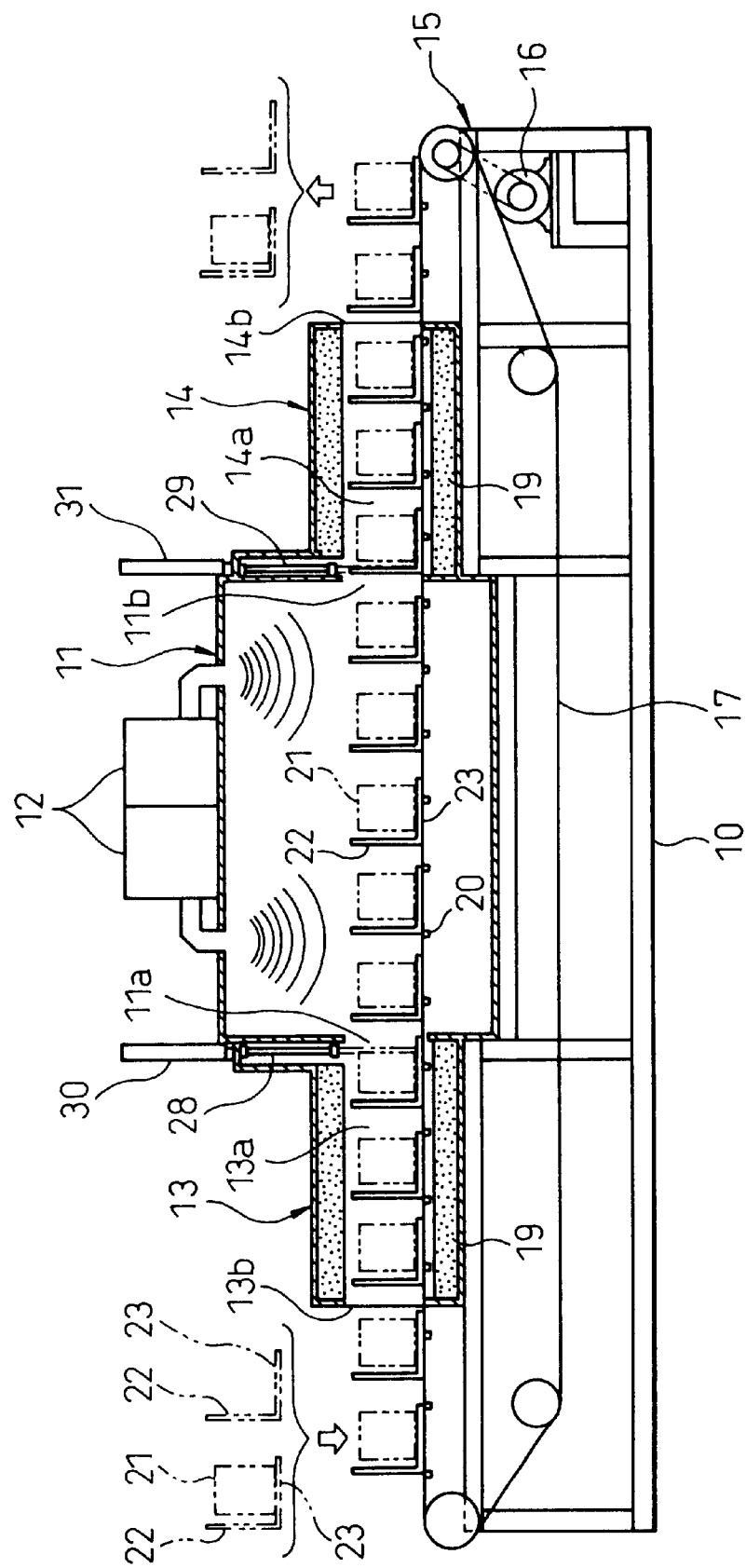
FIG. 5 is a schematic longitudinal sectional front view of another embodiment of a microwave continuous heating apparatus according to the present invention.

FIG. 5 and FIG. 6 show a second embodiment of the present invention.

In these drawings, elements similar to those in the first embodiment are designated by same reference numerals.

As shown in FIG. 5, in the second embodiment, metal shutters 28, 29 to shield microwave electric power are provided at the front and the rear openings 11a, 11b of the heating compartment 11, respectively. The shutters 28, 29 are interlocked with air cylinders 30, 31 to open/close in the up-and-down direction.

In a continuous heating apparatus according to the second embodiment, similar to the first embodiment, leakage of microwave electric power from the heating compartment 11 to the outside can be prevented when the metal reflecting plates 22 are positioned in the microwave absorbing compartments 13, 14.

In the continuous heating apparatus according to the second embodiment, as shown in FIG. 6A, when the shutters 28, 29 close the front and rear openings, the microwave generator 12 begins to generate microwave electric power at the beginning of heating operation.

As shown in FIG. 6B, when the to-be-heated object 21 placed on the jig 23 integral with the reflecting plate 22 is transferred into the microwave absorbing compartment 13, and reaches the vicinity of the entrance side shutter 28, the shutter 28 is opened by a proximity sensor (not shown) and, then the to-be-heated object 21 begins to successively enter the heating compartment 11.

At this time, the microwave generator 12 is controlled to generate the amount of energy suitable for the to-be-heated object. When the largest number of to-be-heated objects 21 is accommodated in the heating compartment 11, the output of the microwave generator 12 reaches a predetermined maximum value.

At this time, the exit side shutter 29 of the heating compartment 11 is still closed to ensure the least leakage of microwave electric power into the exit side microwave absorbing compartment 14.

After that, as shown in FIG. 6C, when the jig 23 having thereon the frontmost object 21 to be heated approaches the exit side shutter 29, the shutter 29 is opened in accordance with a signal of the proximity sensor (not shown) and, then the jig 23 having thereon the to-be-heated object 21 is transferred to the exit side microwave absorbing compartment 14, and the microwave absorbing compartment 14 is filled with the reflecting plates 22 integral with the jigs 23. Accordingly, leakage of microwave electric power can be prevented, and the inside of the microwave absorbing compartment 14 can be prevented from being overheated by microwave electric power.

When the microwave heating operation is stopped, the shutter 28 is closed after it is confirmed, based on the signal of the proximity sensor (not shown), that the jig 23 having thereon the last to-be-heated object 21 has passed through the entrance side shutter 28, as shown in FIG. 6D.

The output of microwave electric power is decreased as the amount of the to-be-heated object is decreased.

The shutter 29 is closed immediately after it is confirmed that the jig 23 having thereon the rearmost object 21 to be heated has passed through the exit side shutter 29, based on the signal of the proximity sensor (not shown), as shown in FIG. 6E, and the output of microwave electric power is stopped to stop the heating.

In the second embodiment of the microwave continuous heating apparatus having the above structure, while a plurality of reflecting plates that are spaced in a forward-and-backward direction are transferred by the transfer device, a plurality of to-be-heated objects that should be heated are respectively placed between two adjacent reflecting plates 22, and are successively transferred to the heating compartment 11 and, then are heated by microwave electric power, while passing through the heating compartment 11, at a transfer section between the vicinity of the entrance 13b of the microwave absorbing compartment 13 positioned at the front of the heating compartment 11 and the vicinity of the exit 14b of the microwave absorbing compartment 14 positioned at the rear of the heating compartment 11.

Shutters 28, 29 respectively provided at front and rear openings 11a, 11b of the heating compartment 11 are opened when the to-be-heated object 21 (or the reflecting plate 22) positioned at a front end of the line reaches the vicinity of the shutters 28, 29, and are closed when the reflecting plate 22 (or the to-be-heated object 21) positioned at a rear end of the line passes through the shutters 28, 29. Therefore, when the shutters 28, 29 are closed, the shutters 28, 29 can prevent microwave electric power from leaking from the heating compartment 11.

On the other hand, when the shutters 28, 29 are opened, the reflecting plates 22 are respectively positioned in the paths 13a, 14a of the microwave absorbing compartments 13, 14, so that microwave electric power can be reliably absorbed and dispersed in the microwave absorbing compartments 13, 14.

Therefore, it is not necessary to intermittently irradiate microwave electric power, and thus, the to-be-heated object can be efficiently heated by continuous irradiation of microwave electric power.

Even in conveyance of to-be-heated objects 21 at the minimum pitches corresponding to the distance between the objects, microwave electric power can be prevented from leaking in the paths 13a, 14a of the microwave absorbing compartments 13, 14, and the to-be-heated objects 21 can be certainly transferred. Also, as the microwave electric power can be continuously irradiated, the length of the heating compartment 11 and the length of the microwave absorbing compartments 13, 14 provided at the front and the rear of the heating compartment 11 are minimized, to thereby make the apparatus small as a whole.

Since an unnecessary space between the objects 21 to be heated can be minimized, the number of objects 21 to be heated that can be accommodated in the heating compartment 11 can be increased. Thus, a heating efficiency by microwave electric power can be enhanced, and the cost for the heating process can be reduced.

It is not necessary to transfer a number of vacant reflecting plates 22 when a plurality of to-be-heated objects are transferred. Therefore, the number of reflecting plates 22 that are necessary when the to-be-heated objects 21 are heated can be minimized.

Therefore, a load applied to the transfer device can be reduced, and the efficiency of heating can be improved.

The to-be-heated object 21 and the reflecting plate 22 can be supplied onto the conveyor belt 17 in the vicinity of the entrance 13b of the microwave absorbing compartment 13 provided at the front of the heating compartment 11, and can be removed from the conveyor belt 17 in the vicinity of the exit 14b of the microwave absorbing compartment 14 provided at the rear of the heating compartment 11. Therefore, a distance in which the to-be-heated object 21 and the reflecting plate 22 are transferred by the conveyor belt 17 can be minimized, and a load applied to the transfer device can be reduced.

In the continuous heating apparatus according to the second embodiment, there is a possibility of leakage of microwave electric power in the heating compartment 11 into the path 14a of the microwave absorbing compartment 14 in the period of time between the opening of the exit side shutter 29 to which the frontmost jig 23 having the first object 21 to be heated comes close and the entry of the microwave reflecting plate 22 integral with the frontmost jig 23 past the shutter 29 into the path 14a of the exit side microwave absorbing compartment 14. However, as the microwave reflecting plate 22 integral with the frontmost jig 23 enters the path 14a of the exit side microwave absorbing compartment 14 immediately after the shutter 29 is opened, only slight leakage of the microwave electric power occurs.

In order to reduce the amount of leakage of microwave electric power from the heating compartment 11 to the path 14a of the microwave absorbing compartment 14 when the exit side shutter 29 is opened, the vacant jig 23 having no to-be-heated object thereon may be placed in front of the jig 23 having the first to-be-heated object 21 thereon so that the shutter 29 is opened when the microwave reflecting plate 22 integral with the vacant jig 23 comes close to the shutter 29.

In order to reliably prevent leakage of microwave electric power to the outside when the exit side shutter 29 is opened, an additional shutter (not shown) may be provided at the exit 14b of the path 14a of the exit side microwave absorbing compartment 14.

The additional shutter is closed when the exit side shutter 29 is opened, and is opened when the jig 23 having the first to-be-heated object 21 thereon enters the path 14a of the microwave absorbing compartment 14 and comes close to the additional shutter, and is closed after the jig 23 having the last to-be-heated object 21 thereon passes through the exit 14b of the microwave absorbing compartment 14.

If the above additional shutter is provided, similar to the shutters 28, 29, it is not necessary to frequently open/close the additional shutter. Therefore, the operation thereof can be easily controlled, or reliability can be ensured without a problem caused by wearing, etc.

Figure 7:
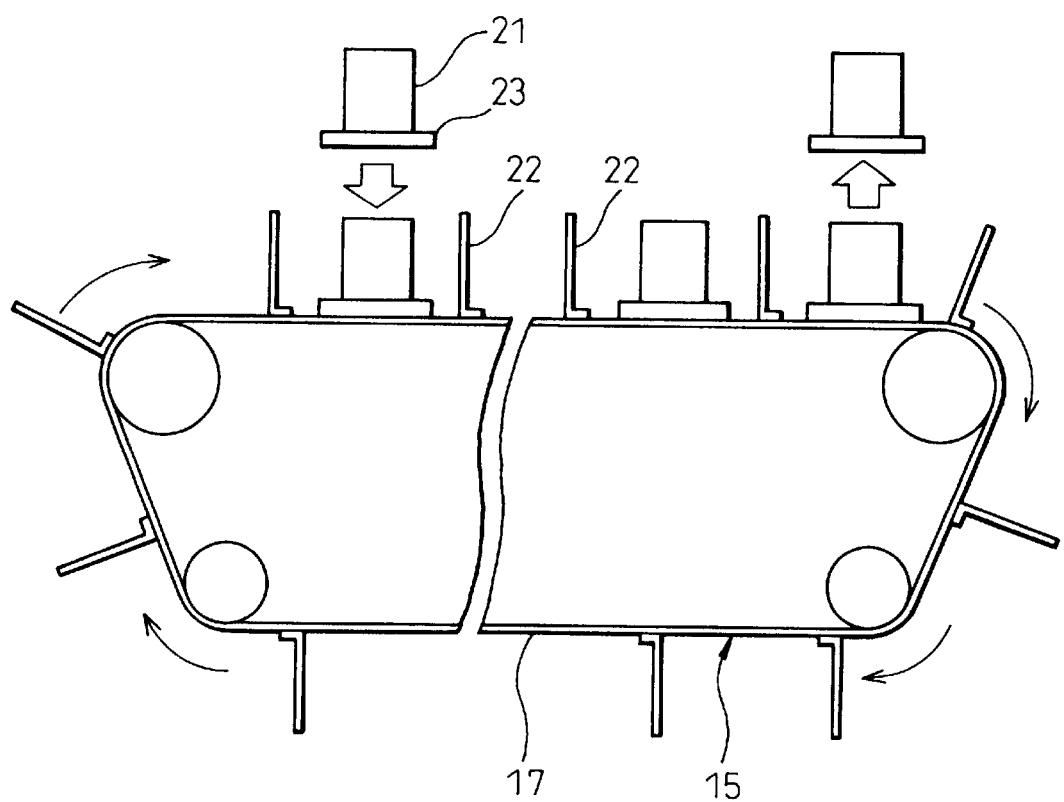
FIG. 7 is a schematic view of a third embodiment of a main part of a microwave continuous heating apparatus according to the present invention.

FIG. 7 shows a third embodiment of the present invention.

In the third embodiment, the metal reflecting plate 22 is separated from the jig 23 on which the to-be-heated object is placed. The reflecting plates 22 that are spaced from each other are provided on the entire periphery of the conveyor belt 17 as a circulating carriage.

Although illustrated figures are omitted, as in the first embodiment and the second embodiment, the heating compartment 11 and the microwave absorbing compartments 13, 14 provided at the front and the rear portions thereof are placed on a carriage route of the conveyor belt 17.

The structure of the third embodiment can be used as a variation of the structure of the first embodiment.

In case of the third embodiment, the reflecting plates 22 that are spaced from each other circulate with the conveyor belt 17. Therefore, an operation for supplying or removing the reflecting plate 22 onto/from the transfer device 15 can be omitted, and the to-be-heated object 21 can be placed between two adjacent reflecting plates 22 via the jig 23 and easily transferred.

At least one reflecting plate 22 can be easily positioned in each of the paths of the microwave absorbing compartments 13, 14 provided at front and rear of the heating compartment 11, at least during irradiation of microwave electric power in the heating compartment 11.

Figure 8A:
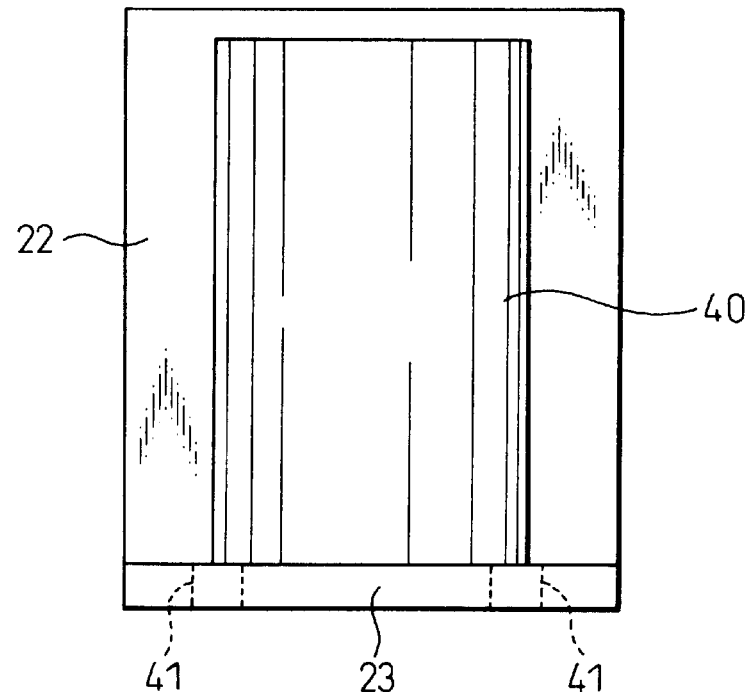
FIG. 8A is a front view of a jig having a ceramic honeycomb body thereon according to an embodiment to heat and dry the ceramic honeycomb body.
Figure 8B:
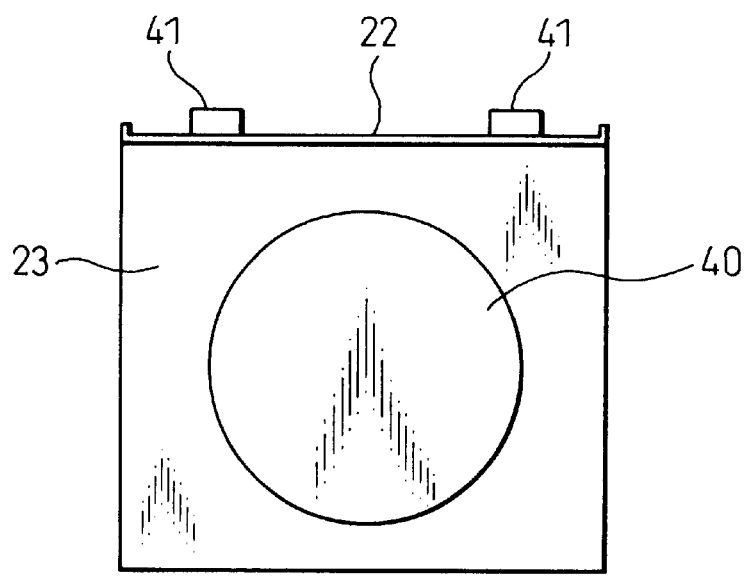
FIG. 8B is a plan view of FIG. 8A.

FIGS. 8A and 8B show an embodiment in which a ceramic honeycomb body of ceramic is dried by the above-described microwave continuous heating apparatus.

In this case, a ceramic honeycomb body 40 is supplied onto the conveyor belt 17 and successively passes through the heating compartment 11, after being placed on the above-described jig 23, to heat the same by microwave electric power in accordance with the above-described manner. Thus, the ceramic honeycomb body 40 can be continuously dried.

In this embodiment, the material of the reflecting plate 22 is not particularly limited as long as it can reflect microwave electric power. However, SUS (stainless) steel or aluminum, in which no rust occurs due to water or heat, is suitable.

The area of the opening of the apparatus can be reduced as the size of the reflecting plate 22 is equal to or larger than the maximum size of the ceramic honeycomb body 40 and is as close as possible to the size of the openings 11a, 11b of the heating compartment 11. This small opening contributes to prevention of leakage of microwave electric power.

In this embodiment, the electrically insulating spacer 41 provided on the jig 23 can prevent a spark that may occur when the jigs are in contact with each other during irradiation of microwave electric power.

The microwave absorbing body is provided in the heating compartment 11 in addition to the reflecting plate 22. This is further advantageous to prevent leakage of microwave electric power.

Figure 9A:
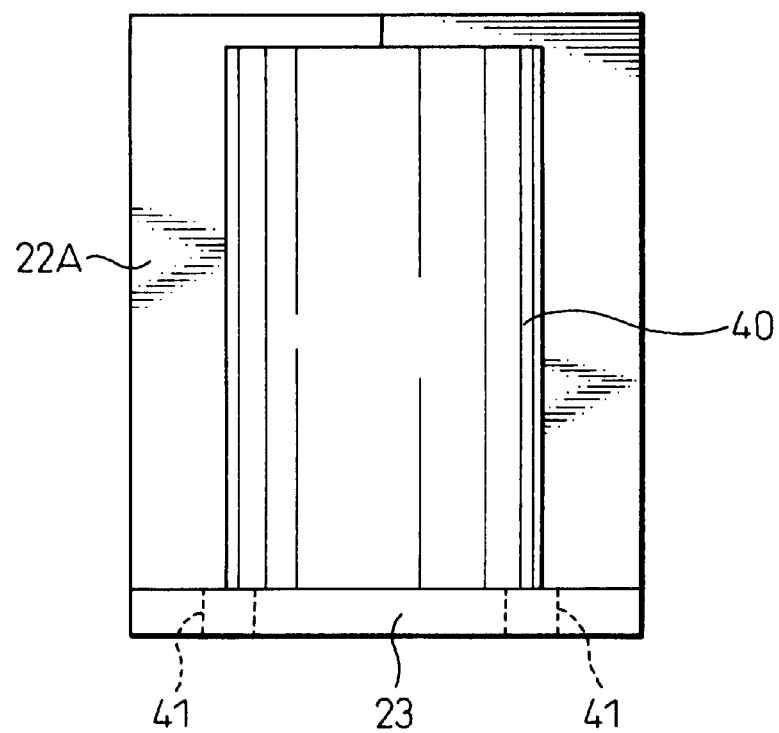
FIG. 9A is a front view, similar to FIG. 8A, of an embodiment in which a curved reflecting plate is provided.
Figure 9B:
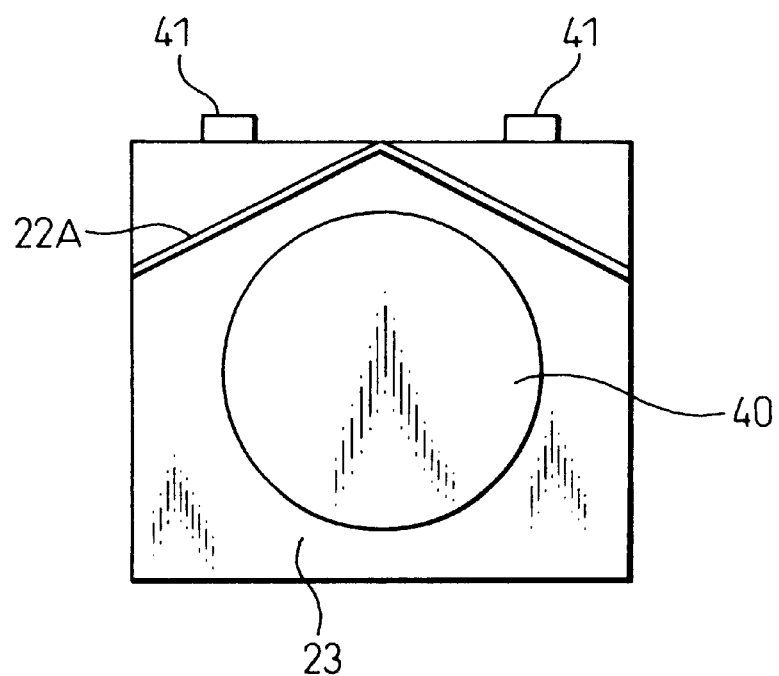
FIG. 9B is a plan view of FIG. 9A.

FIGS. 9A, 9B show an embodiment in which a bent reflecting plate 22A is provided.

Similar to the above-described reflecting plate 22, the reflecting plate 22A prevents leakage of microwave electric power, and reflects microwave electric power to the to-be-heated object.

In this embodiment, the reflecting plate 22A is bent in the form of an "L" toward the ceramic honeycomb body 40. Therefore, microwave electric power reflected by the reflecting plate 22A is irradiated onto the ceramic honeycomb body 40, so that the ceramic honeycomb body 40 is uniformly heated and dried.

Specifications (shape, bending angle, bending position, etc.) of the reflecting plate 22A are appropriately determined in accordance with the size, the shape or the degree of dry of the ceramic, so that microwave electric power can be uniformly irradiated. Thus, the dimensional accuracy of the ceramic honeycomb body, etc., can be improved.

Figure 10A:
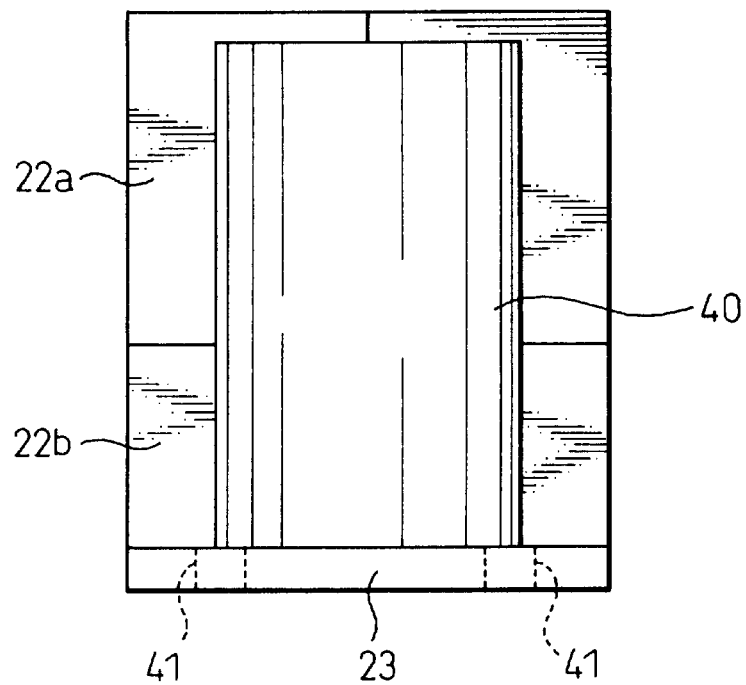
FIG. 10A is a front view, similar to FIG. 8A, of an embodiment in which a first planar reflecting plate and a second curved reflecting plate are provided.
Figure 10B:
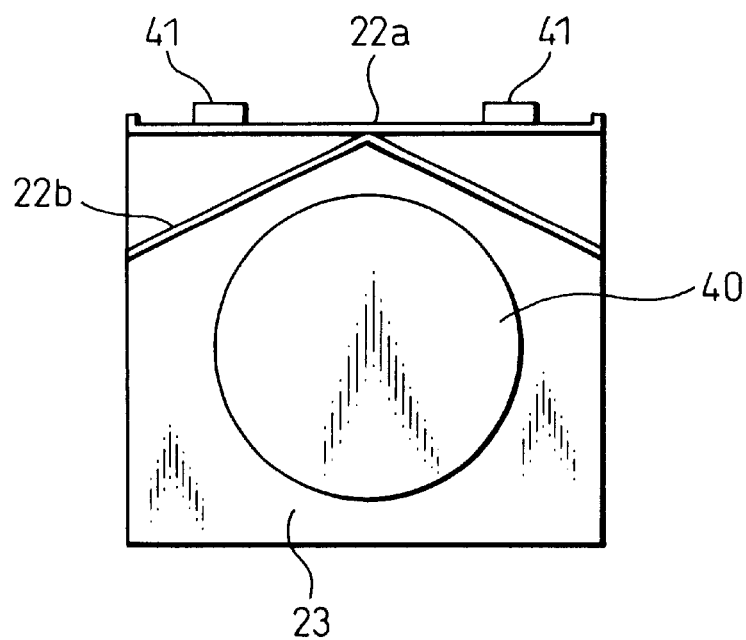
FIG. 10B is a plan view of FIG. 10A.

FIG. 10 shows an embodiment in which a planar reflecting plate 22a and a bent reflecting plate 22b are provided.

In this embodiment, the reflecting plate 22a, similar to the above-described reflecting plate 22, prevents leakage of microwave electric power, and the reflecting plate 22b, similar to the above-described reflecting plate 22A, reflects microwave electric power toward the ceramic honeycomb body 40.

The ceramic honeycomb body (ceramic) 40 is well known as a formed body such as a catalyst carrier ceramic honeycomb for vehicle, a diesel particulate collecting ceramic filter or a fuel cell. However, this ceramic honeycomb body 40 is formed as a columnar honeycomb body having a number of through-holes therein, as shown in FIGS. 11A, 11B, by extruding a clay-like ceramic material, to which water or the like is added, through a predetermined-shaped mold by use of a screw-type or a piston-type extrusion machine.

Figure 11A:
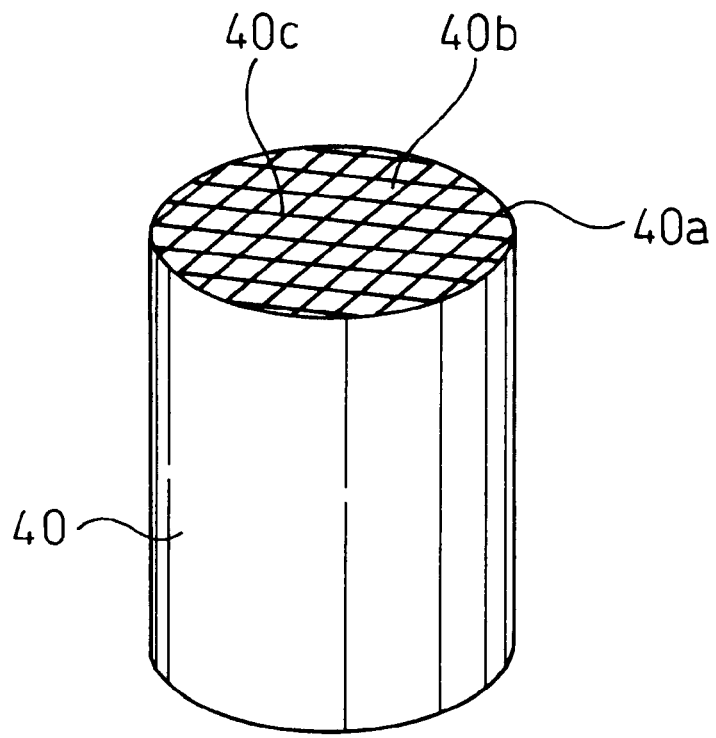
FIG. 11A is a perspective view of a ceramic honeycomb body.
Figure 11B:
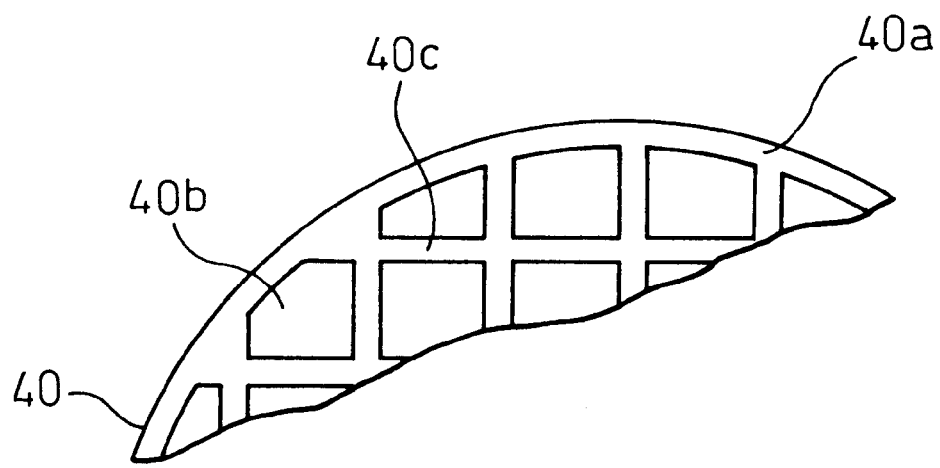
FIG. 11B is a partially enlarged plan view of the honeycomb body.

FIG. 11A shows a perspective view of the ceramic honeycomb body 40. FIG. 11B shows a partially enlarged plan view of the same honeycomb body 40, in which 40a designates an outer peripheral skin portion, 40b a cell, and 40c a cell wall.

The extruded ceramic honeycomb body 40 having a volume of about 500 cc to 15000 cc is large, and contains a large quantity of water equal to 10% to 30% of the entire mass. The cell wall 40c whose thickness is 0.025 mm to 0.4 mm is very thin, and has little strength. Therefore, if a generally known hot-air drying method is used, there is a problem with fractures due to irregular heat shrinkage caused by a difference in drying speed between the inside and the outside of the honeycomb body.

If a conventional microwave drying equipment is used, the ceramic honeycomb body 40 is subject to a batch drying, owing to the volume or the water content thereof. Moreover, it is necessary to use microwave drying equipment having a double shutter because of the large size thereof.

Consequently, a continuous drying operation having a slow tact-time, including synchronization of the work pieces, or the like, is carried out, thus resulting in a very poor productivity. As can be seen from the above, according to the microwave continuous heating apparatus of the present invention, even the ceramic honeycomb bodies 40 can be efficiently continuously dried.

Although the above discussion has been addressed to the illustrated embodiments, the transfer device 15 may be provided with, for example, a circulating carriage which circulates in a horizontal plane, in another embodiment.

In the above embodiment, a belt conveyor is used as the transfer device 15. However, the transfer device is not limited thereto. For example, a roller conveyor-type transfer device or a pusher-type transfer device in which the jigs to carry the to-be-heated objects, that have been supplied onto a stationary transfer bed are pushed at predetermined pitches by an air cylinder to move the jigs intermittently, may be used.

In the above embodiment, the to-be-heated object 21 is placed on the transfer device 15 via the jig 23. However, the jig 23 may be omitted.

The jig 23 may be separated from the reflecting plate 22, and they may be separately placed on the transfer device.

The jig 23 may be entirely made of microwave permeable material.

As described above, according to the present invention, the microwave absorbing compartments are respectively connected to the front and the rear portions of the heating compartment; the to-be-heated object placed between two adjacent reflecting plates is transferred with the reflecting plates while a plurality of metal reflecting plates are transferred by the transfer device; as the reflecting plates are placed on the transfer device so that at least one reflecting plate is positioned in each microwave absorbing compartment, at least during irradiation of microwave electric power in the heating compartment, even if the size of the opening provided at each of the front and the rear of the heating compartment is larger than the wavelength of the microwave electric power used in the heating compartment, leakage of microwave electric power can be comparatively easily prevented in the microwave absorbing compartment by providing an appropriate amount of the metal reflecting plates and to-be-heated objects.

Therefore, the microwave continuous heating apparatus, in which microwave electric power can be continuously irradiated without intermittent output thereof even if the size of opening is larger than one wavelength, can be easily realized.

The to-be-heated objects can be transferred at minimum pitches. Therefore, the length of the heating compartment and the length of the microwave absorbing compartment provided at each of the front and the rear portions of the heating compartment are minimized, so that the heating efficiency can be enhanced, the cost of the apparatus can be reduced, and a space for installation can be reduced.

On the other hand, according to the present invention in which metal shutters are provided at the front and rear openings of the heating compartment, the above-mentioned effects can be obtained. Also, each shutter is opened/closed so as not to overheat the microwave absorbing body in the absorbing compartment at the beginning, i.e., when the to-be-heated objects enter the heating compartment and at the end, i.e., when the last object to be heated is removed from the heating compartment. Thus, thermal degradation, breakage, etc., can be prevented, thus leading to prolongation of the service life.

The shutter is operated only at the beginning and at the end, so that the opening/closing operations are carried out less frequently. Therefore, the reliability can be ensured without a problem caused by wear, etc.

According to the present invention, bent reflecting plates are provided. The reflecting plates not only prevent leakage of microwave electric power, but also reflect microwave electric power toward the to-be-heated objects. Thus, the to-be-heated objects can be uniformly heated.

If reflecting plate, to reflect microwaves toward the to-be-heated object, is provided in addition to the reflecting plate to prevent leakage of microwave electric power, the effects to prevent leakage and to ensure uniform heating of the to-be-heated objects can be more certainly expected.

The present invention provides a microwave continuous heating apparatus which can be advantageously used as a drying apparatus for drying ceramics owing to uniform heating of the to-be-heated objects and prevention of leakage of microwave electric power.

While the invention has been described by reference to specific embodiments chosen for purposes of illustration, it should be apparent that numerous modifications could be made thereto by those skilled in the art without departing from the basic concept and scope of the invention.

What is claimed is:

1. A microwave continuous heating apparatus provided with a heating compartment having openings at its front and rear portions; and a transfer device which carries a to-be-heated object held thereon through the heating compartment, whereby the object to be heated is irradiated with microwave electric power during passing through the heating compartment to heat the same, comprising microwave absorbing compartments connected to the front and the rear portions of the heating compartment so that the object to be heated can pass therethrough; and a plurality of reflecting plates of metal which are spaced from each other in a forward and backward direction and which are transferred by the transfer device, wherein the object to be heated is placed between two adjacent reflecting plates, and the reflecting plates are placed on the transfer device so that at least one reflecting plate is positioned in each microwave absorbing compartment, at least during irradiation of microwave electric power in the heating compartment, wherein the to-be-heated object and the reflecting plates are supplied onto the transfer device in the vicinity of an entrance of the microwave absorbing compartment provided at the front of the heating compartment, and are removed from the transfer device in the vicinity of an exit of the microwave absorbing compartment provided at the rear of the heating compartment, and wherein the reflecting plates are respectively secured to jigs on which the to-be-heated object can be placed.

2. A microwave continuous heating apparatus according to claim 1, wherein the transfer device has a circulating carriage, and the reflecting plates are spaced and placed on the entire periphery of the circulating carriage.

3. A microwave continuous heating apparatus according to claim 1, wherein the shape and size of the reflecting plates are such that they can pass through the microwave absorbing compartment with a slight gap, and the inner surface of the microwave absorbing compartment is covered by a microwave absorbing body.

4. A microwave continuous heating apparatus according to claim 1, wherein the reflecting plates are bent in the form of "L" in cross section or are curved in cross section toward the object to be heated.

5. A microwave continuous heating apparatus according to claim 1, wherein the reflecting plates are each comprised of a first planar reflecting plate and a second reflecting plate that is L-shaped or is curved in cross section toward the object to be heated.

6. A microwave continuous heating apparatus according to claim 1, wherein ceramic bodies, as the objects to be heated, are continuously heated.

7. A microwave continuous heating apparatus according to claim 1, wherein a plurality of vacant jigs having no object to be heated thereon are placed and transferred at front and rear portions of the jig having the object to be heated thereon, respectively.

8. A microwave continuous heating apparatus provided with a heating compartment having openings at its front and rear portions; and a transfer device which carries a to-be-heated object held thereon through the heating compartment, whereby the object to be heated is irradiated with microwave electric power during passing through the heating compartment to heat the same, comprising microwave absorbing compartments connected to the front and the rear portions of the heating compartment so that the object to be heated can pass therethrough; and a plurality of reflecting plates of metal which are spaced from each other in a forward and backward direction and which are transferred by the transfer device, wherein the object to be heated is placed between two adjacent reflecting plates, and the reflecting plates are placed on the transfer device so that at least one reflecting plate is positioned in each microwave absorbing compartment, at least during irradiation of microwave electric power in the heating compartment, wherein the to-be-heated object and the reflecting plates are supplied onto the transfer device in the vicinity of an entrance of the microwave absorbing compartment provided at the front of the heating compartment, and are removed from the transfer device in the vicinity of an exit of the microwave absorbing compartment provided at the rear of the heating compartment, and wherein the reflecting plates are made integral with a jig on which the to-be-heated object can be placed, at a front end or a rear end, or both the front and rear ends of the jig.

9. A microwave continuous heating apparatus according to claim 8, wherein a plurality of vacant jigs having no object to be heated thereon are placed and transferred at the front and rear portions of the jig having the object to be heated thereon, respectively.

10. A microwave continuous heating apparatus provided with a heating compartment having openings at its front and rear portions; and a transfer device which carries a to-be-heated object held thereon through the heating compartment, whereby the object to be heated is irradiated with microwave electric power during passing through the heating compartment to heat the same, comprising microwave absorbing compartments connected to the front and the rear portions of the heating compartment so that the object to be heated can pass therethrough; shutters provided at the front and rear openings of the heating compartment; and a plurality of reflecting plates which are arranged in a line with the objects to be heated, in a transfer section between the vicinity of an entrance of the microwave absorbing compartment provided at the front of the heating compartment and the vicinity of an exit of the microwave absorbing compartment provided at the rear of the heating compartment, wherein the front and rear shutters are opened when the frontmost to-be-heated object or the reflecting plate of the line reaches the vicinity of the shutter, and are closed when the rearmost to-be-heated object or the reflecting plate of the line passes through the shutter, wherein the reflecting plates are secured to a jig on which the object to be heated can be placed, at a front end or a rear end, or both the front and rear ends of the jig.

11. A microwave continuous heating apparatus according to claim 10, wherein the reflecting plates are made integral with the jig.

12. A microwave continuous heating apparatus according to claim 10, wherein the transfer device has a circulating carriage, and the reflecting plates are spaced and placed on the entire periphery of the circulating carriage.

13. A microwave continuous heating apparatus according to claim 10, wherein the shape and size of the reflecting plates are such that they can pass through the microwave absorbing compartment with a slight gap, and the inner surface of the microwave absorbing compartment is covered by a microwave absorbing body.

14. A microwave continuous heating apparatus according to claim 10, wherein the reflecting plates are bent in the form of "L" in cross section or are curved in cross section toward the object to be heated.

15. A microwave continuous heating apparatus according to claim 10, wherein the reflecting plates are each comprised of a first planar reflecting plate and a second reflecting plate that is L-shaped or is curved in cross section toward the object to be heated.

16. A microwave continuous heating apparatus according to claim 10, wherein ceramic bodies, as the objects to be heated, are continuously heated.

17. A microwave continuous heating apparatus provided with a heating compartment having openings at its front and rear portions; and a transfer device which carries a to-be-heated object held thereon through the heating compartment, whereby the object to be heated is irradiated with microwave electric power during passing through the heating compartment to heat the same, comprising microwave absorbing compartments connected to the front and the rear portions of the heating compartment so that the object to be heated can pass therethrough; and a plurality of reflecting plates of metal which are spaced from each other in a forward and backward direction and which are transferred by the transfer device, wherein the object to be heated is placed between two adjacent reflecting plates, and the reflecting plates are placed on the transfer device so that at least one reflecting plate is positioned in each microwave absorbing compartment, at least during irradiation of microwave electric power in the heating compartment, the to-be-heated object and the reflecting plates are supplied onto the transfer device in the vicinity of an entrance of the microwave absorbing compartment provided at the front of the heating compartment, and are removed from the transfer device in the vicinity of en exit of the microwave absorbing compartment provided at the rear of the heating compartment, the reflecting plate is separated from a jig on which the to-be-heated object can be placed, and the reflecting plate and the jig are separately placed on the transfer device.

* * * * *